United States Patent
Garcia Morchon (10) Patent No.: US 9,930,166 B2
(45) Date of Patent: Mar. 27, 2018

(54) METHOD FOR OPERATING A COMMUNICATION DEVICE IN A COMMUNICATION NETWORK, A COMMUNICATION DEVICE, A LUMINAIRE EQUIPPED WITH SUCH COMMUNICATION DEVICE

(71) Applicant: PHILIPS LIGHTING HOLDING B.V., Eindhoven (NL)

(72) Inventor: Oscar Garcia Morchon, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/902,919

(22) PCT Filed: Jun. 27, 2014

(86) PCT No.: PCT/EP2014/063681
§ 371 (c)(1),
(2) Date: Jan. 28, 2016

(87) PCT Pub. No.: WO2015/000803
PCT Pub. Date: Jan. 8, 2015

(65) Prior Publication Data
US 2016/0156765 A1 Jun. 2, 2016

(30) Foreign Application Priority Data
Jul. 5, 2013 (EP) .................................... 13175236

(51) Int. Cl.
*H04M 3/00* (2006.01)
*H04M 1/725* (2006.01)
(Continued)

(52) U.S. Cl.
CPC ...... *H04M 1/72533* (2013.01); *H04L 67/303* (2013.01); *H04W 76/023* (2013.01); *H04W 84/20* (2013.01); *H05B 37/0272* (2013.01)

(58) Field of Classification Search
CPC . H04W 8/245; H04W 88/06; H04M 1/72533; H04M 1/72519
(Continued)

(56) References Cited

U.S. PATENT DOCUMENTS 6,909,705 B1    6/2005 Lee et al.
8,165,628 B1 *  4/2012 Sinai ..................... H04W 88/06
                                                    455/550.1
(Continued)

OTHER PUBLICATIONS

Notice of Opposition to European Patent 3017661, Jan. 15, 2018(28 pages).

*Primary Examiner* — Danh Le
(74) *Attorney, Agent, or Firm* — Akarsh P. Belagodu (57) ABSTRACT

This invention related to a communication device and a method for operating a communication device comprising a transceiver being adapted to communicate in a communication network, comprising a configuration phase including the step of (a1) the communication device obtaining by means of a first telecommunication mode a selected role profile selected out of a set of role profiles, said selected role profile defining the role of the communication device in the communication network in an operation phase, and an operation phase including the steps of (b1) the communication device disabling or maintaining its transceiver to communicate by means of the first telecommunication mode depending on the selected role profile; (b2) the communication device communicating in the network using a second telecommunication mode.

14 Claims, 4 Drawing Sheets

(51) Int. Cl.
*H05B 37/02* (2006.01)
*H04W 84/20* (2009.01)
*H04L 29/08* (2006.01)
*H04W 76/02* (2009.01)

(58) Field of Classification Search
USPC ............ 455/418, 420, 550.1, 552.1; 370/328
See application file for complete search history.

(56) References Cited

U.S. PATENT DOCUMENTS

| | | | |
|---|---|---|---|
| 8,478,360 B2 | 7/2013 | Soliman | |
| 8,953,490 B2 * | 2/2015 | Montemurro | H04W 4/206 370/239 |
| 2002/0093956 A1 | 7/2002 | Gurin | |
| 2004/0198319 A1 | 10/2004 | Whelan et al. | |
| 2005/0097162 A1 | 5/2005 | Budike, Jr. | |
| 2008/0182614 A1 * | 7/2008 | Cormier | H04W 8/205 455/552.1 |
| 2010/0299419 A1 | 11/2010 | Ramankutty et al. | |
| 2010/0303008 A1 * | 12/2010 | Wietfeldt | H04W 76/025 370/328 |
| 2011/0178650 A1 | 7/2011 | Picco | |
| 2012/0020060 A1 | 1/2012 | Myer et al. | |
| 2012/0036181 A1 * | 2/2012 | Isidore | G06Q 50/01 709/203 |
| 2012/0040606 A1 | 2/2012 | Verfuerth | |
| 2012/0169249 A1 * | 7/2012 | Loveland | H05B 37/0245 315/291 |
| 2012/0188991 A1 * | 7/2012 | Kholaif | H04W 84/22 370/338 |
| 2013/0016696 A1 * | 1/2013 | Adjakple | H04W 76/025 370/331 |
| 2013/0142112 A1 * | 6/2013 | Yang | H04W 8/183 370/328 |
| 2014/0040504 A1 * | 2/2014 | Gupta | H04W 24/04 709/244 |

* cited by examiner

METHOD FOR OPERATING A COMMUNICATION DEVICE IN A COMMUNICATION NETWORK, A COMMUNICATION DEVICE, A LUMINAIRE EQUIPPED WITH SUCH COMMUNICATION DEVICE

CROSS-REFERENCE TO PRIOR APPLICATIONS

This application is the U.S. National Phase application under 35 U.S.C. § 371 of International Application No. PCT/EP2014/063681, filed on Jun. 27, 2014, which claims the benefit of European Patent Application No. 13175236.2, filed on Jul. 5, 2013. These applications are hereby incorporated by reference herein.

FIELD OF THE INVENTION

The present invention relates to a method for operating a communication device and to communication networks.

This invention is, for example, relevant for luminaires equipped with such communication devices, which may be wireless and for method for commissioning and operating such communication devices in a lighting network. The invention could be more specifically applied to outdoor lighting networks.

BACKGROUND OF THE INVENTION

Communication networks, for example wireless networks for automation, like lighting networks, know a huge development and a number of products on this area including StarSense Wireless, StarSense Powerline, or the CityTouch CTC are being installed in cities or along the roads. The business proposition is that the management of the lighting devices can lead to a lower energy bill, it also allows for reconfiguration, or even other services.

In case of lighting communication networks, the commissioning or the maintenance (software update, topology update etc) represent usually an important effort. This is even worse in case of outdoor lighting control, i.e., the management of outdoor lighting devices by means of communication protocols, where the nodes (or outdoor lighting controllers (OLCs)) can be devices disposed on the top of 5 meters high lamp posts, on a highway. Accordingly, the installation and commissioning costs, if done manually, are high.

In some systems, each lamp is controlled by means of an OLC forming a large mesh network in which the communication links are based on IEEE802.15.4 and a communication stack, e.g., based on 6LoWPAN/CoAP or a proprietary one. The network is managed from the backend by means of a segment controller connecting the 6LoWPAN network with the Internet. Thus, in this solution, an OLC includes a CPU and a communication interface based on 802.15.4.

In such systems, during a configuration phase, like the commissioning phase or an update phase, each lamp is exchanging data with a special commissioning tool that an installer needs to bring in the vicinity of the node (sometimes even with wired connection). The commissioning tool may comprise a GPS chipset to determine the location of each commissioned node.

In other systems, it has been proposed that each Outdoor Lighting Controller is outfitted with a GPS and GPRS module. After installation, each communication device connects directly to a network controller by GPRS for exchanging configuration info and carry out the commissioning process. Such a network is designed thinking about simple commissioning and simple asset management without requiring a specific commissioning process. Since the each OLC has a GPRS and GPS module, the OLC can just start the communication after installation and the corresponding device automatically appears at the network controller and can be controlled.

The advantage of such solution is that the installation process and the configuration phases are simpler than previously described systems. Moreover, the commissioning process is likely to be less expensive since it does not require the installer to carry out the commissioning on site. Such a communication device is easy to install and manage, but it requires an active GPRS link per communication device during the whole lifetime of a device. Such a link for a large network represents a significant operation cost over the operation phase of the network.

SUMMARY OF THE INVENTION

It is an object of the invention to propose a method enabling an easy commissioning of the network nodes.

It is another object of the invention to propose a method and a communication device able to simplify the configuration phases of the communication devices of the network while maintaining the operation cost of such network to a low level.

To this end, in accordance with a first aspect of the invention, it is proposed a method for operating a communication device comprising a transceiver being adapted to communicate in a communication network, comprising a configuration phase including the step of (a1) the communication device obtaining by means of a first telecommunication mode a selected role profile selected out of a set of role profiles, said selected role profile defining the role of the communication device in the wireless network in an operation phase, and an operation phase including the steps of (b1) the communication device disabling or maintaining its transceiver to communicate by means of the first telecommunication mode depending on the selected role profile;

(b2) the communication device communicating in the network using a second telecommunication mode.

As a consequence, the first telecommunication mode becomes inactive for some of the nodes after the commissioning phase depending whether the communication device profile of a predetermined type. For example, if the communication device is a router, the first telecommunication mode may still being active and used in the operation phase, while for other device profile, this first telecommunication mode is deactivated or even switched off.

Moreover, such first telecommunication may be a long range telecommunication mode which is consuming more energy and/or can be more costly in operation. For example, in case of GPRS, or UMTS or even LTE communication, the required amount of data exchanged between the communication devices and the network controller can represent a high operational cost if all devices are using this telecommunication mode.

For example, in an embodiment of the invention, if it is determined that the role profile of the communication device is an end device profile then, the part of the transceiver can be prevented to communicate with the first telecommunication mode. For example, the part of the transceiver operating in accordance with the first telecommunication mode can be powered off, or logically deactivated. In case this first telecommunication mode is based on a subscription or a registration, it could be possible to terminate the subscription or log off the registration.

In another variant of this aspect of the invention, which may be combined with the previous example, if it is determined that the role profile of the communication device is a router profile the transceiver maintains the communication in the transceiver in accordance with the first telecommunication mode. It is to be noted that maintaining the first telecommunication mode in the transceiver should also be understood as enabling the first telecommunication mode if it was not used previously. Then, in an operation phase, as a router, the communication device communicates in the network using also the first telecommunication mode. For example, a router is linked on one side with other communication devices by means of the second telecommunication mode and on the other side with a network controller (e.g., cloud-based) by means of the first telecommunication mode. The network controller may be in charge of configuring the network, or of transmitting control commands to other communication devices of the network through the communication device with the router profile.

It is to be understood that the configuration phase may correspond to a commissioning process of a network, but also to an update process when a node or a part of the network or even the whole network configuration needs to be reconfigured or updated.

The present invention also relates to a communication device comprising a transceiver being adapted to communicate in a communication network, the transceiver being adapted for, in a configuration phase, obtaining by means of a first telecommunication mode a selected role profile selected out of a set of role profiles, and for, in an operation phase, communicating in the communication network using a second telecommunication mode, the communication device further comprising a processor for, in an operation phase, behaving in accordance with said selected role profile in the communication network, and for, in the operation phase, disabling or maintaining the transceiver to communicate by means of the first telecommunication mode depending on the selected role profile.

Thus, thanks to this aspect, the communication device can use its transceiver for communicating with the network controller directly through the first telecommunication mode—if the first telecommunication mode was not disabled—or through the second telecommunication mode to communicate with other communication devices in the network (hop by hop) until a further communication device with an active first telecommunication mode is found through which the network controller can be reached.

In still further aspects of the invention, it is proposed a luminaire equipped and controlled by the communication device in accordance with the preceding aspect of the invention, and a network comprising a network controller and the communication device of in accordance with the preceding aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
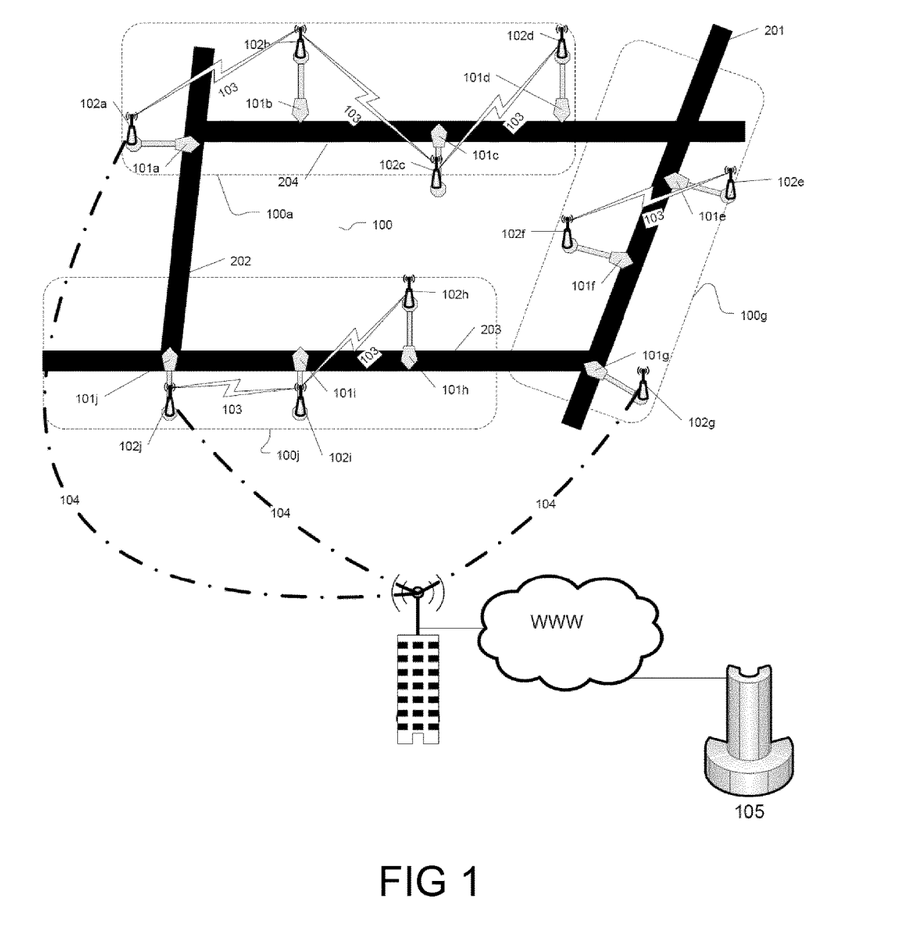
FIG. 1 is a block diagram representing a communication network in accordance with an embodiment of the invention in an operation phase.

The present invention relates to a communication network, like in the illustrative example of FIG. 1 an outdoor lighting wireless network. FIG. 1 depicts an outdoor lighting wireless network in an operation phase.

In this network 100, a plurality of lamps 101*a-j* are located on lamp posts along roads 201-204, for example streets or highways. Each of the lamps 101*a-j* is controlled by a corresponding communication device 102*a-j*. These communication devices may have different role profiles selected out of a set of role profiles. This set of role profiles may be predetermined and each may define the role and/or the behaviour of the communication devices in the network.

For example, the communication devices 102*b-f* and 102*h-i* are end devices in this example. This may mean that they behave as slave stations which operate in accordance to the control commands received from the network. In this exemplary network, communication devices 102*b-f*, and 102*h-i* may also be able to relay control messages to other neighbour communication devices, for example according to routing schemes or broadcast schemes, depending on the configuration of the network. In operation, these communication links 103 may be established typically with a low cost, low range communication technology, like for example a telecommunication mode based on IEEE802.15.4. An example of such telecommunication mode further relies on IPv6, 6LoWPAN, and CoAP.

Another profile may be a border router profile or router profile, where for instance communication devices 102*a*, 102*g* and 102*j* are used as a kind of bridge nodes. This means that on one side, during the operation phase, they can communicate with the other communication devices of the network by means of a first telecommunication mode, like the IEEE802.15.4 telecommunication mode mentioned above. On the other side, they can establish telecommunication links 104 with the network controller 105 by means of a long range, high rate communication technology, like for example a telecommunication mode based on GPRS, or UMTS or LTE.

These roles are selected and defined during a commissioning phase which will be explained below.

Figure 2:
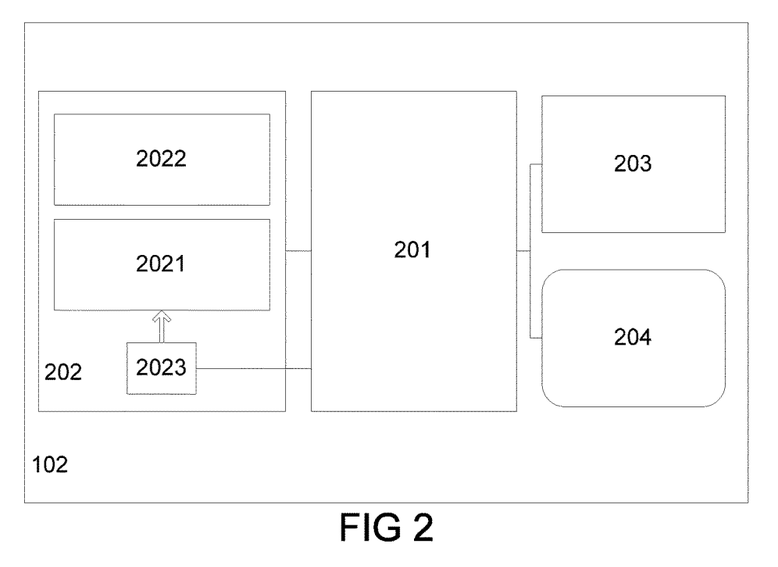
FIG. 2 is a block diagram representing a communication device in accordance with an embodiment of the invention.

In accordance with this first embodiment of the invention, as shown on FIG. 2, the communication device 102 in accordance with a first embodiment of the invention is an outdoor lighting controller which comprises a CPU 201 or a microcontroller, and a transceiver 202. The communication device 102 may also comprise a GPS module 203, a memory 204 which stores for example the configuration information including the role profile of the communication device 102. In an embodiment of the invention, the software used by the microcontroller 201 for operating the communication device may also be stored by this memory. The communication device 102 may be powered by the mains which are powering the lamp to which it is attached or by solar panels or other energy means not represented on this figure. The communication device may also comprise a number of actuators and sensors, e.g., a DALI interface for Lighting control, a light sensor, a temperature sensor, or in general, any sensor or actuator.

The transceiver 202 may comprise a first telecommunication module 2021, for example a GPRS module 2021, and a second telecommunication module 2022, for example an IEEE802.15.4 radio. Optionally, the transceiver also comprises a controllable switch 2023 which can power on/off the first telecommunication module 2021. It is to be noted that in a variant of this embodiment, this switch function is operated by the software of the microcontroller 201 connected to the transceiver 202. In another variant, even more telecommunication modules are included to allow for a more flexible and cost-effective solution as described in the embodiments of this invention.

In accordance with an embodiment of the invention, depending on the role profile of the communication device 102, the first transceiver module 2021 is deactivated in an operation phase. This deactivation can be carried out by turning off the power of the first transceiver module, reducing the amount of power used in the communication device 102 and increasing the components of the first transceiver module 2021. Another way (alternative or additive) could also be to unsubscribe or unregister the account linked to this first telecommunication mode. For example, in case of GPRS, the account linked to the SIM card included in the first telecommunication module 2021 may be deleted, or put on hold.

When the communication device enters into a configuration phase, for example a commissioning phase, the first transceiver module 2021 is active to carry out the update or the configuration directly with the network controller 105. During an update phase, the first transceiver module 2021 can also be reactivated to carry out the update or the configuration directly with the network controller 105.

Figure 3:
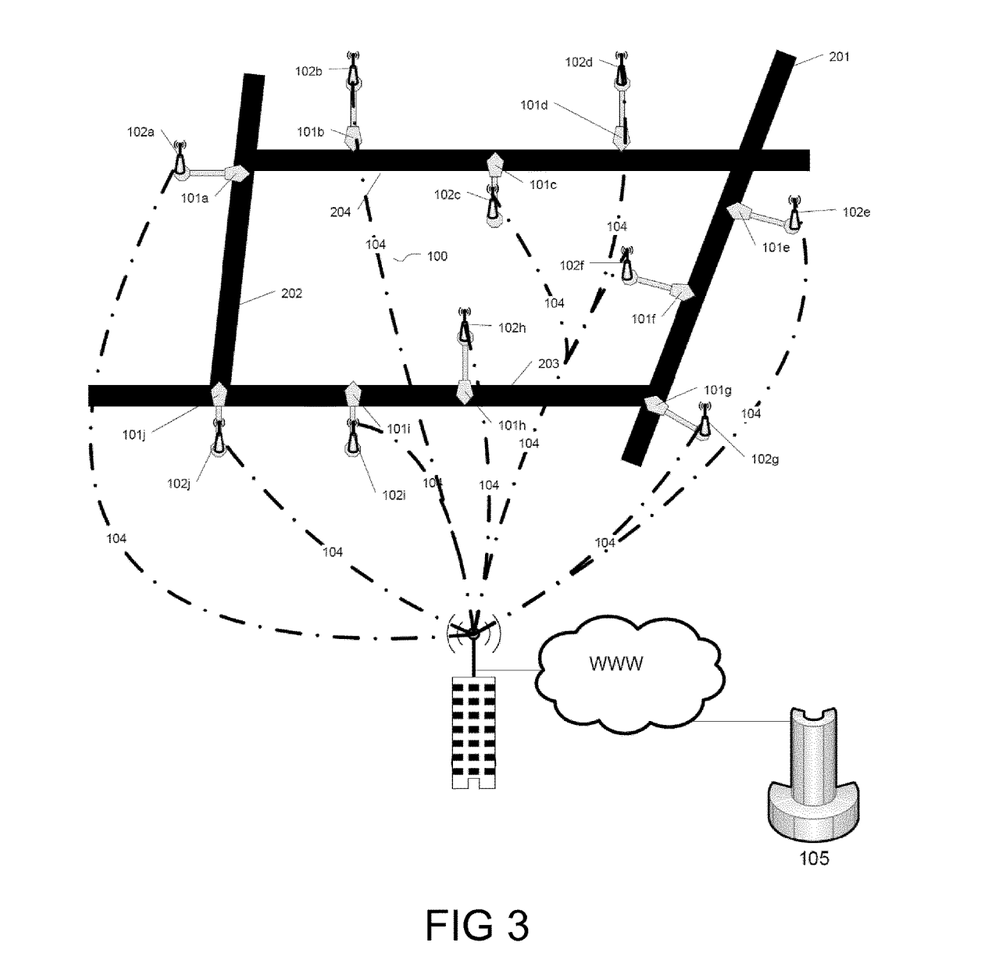
FIG. 3 is a block diagram representing a communication network in accordance with an embodiment of the invention in a configuration phase.

For example, during commissioning, as shown on FIG. 3, the first telecommunication module (e.g. the GPRS module) of the communication devices 102a-j is used for performing a simple commissioning process. Such a commissioning (followed by the operation phase) is detailed with reference to the flowchart of FIG. 4 as an example.

Figure 4:
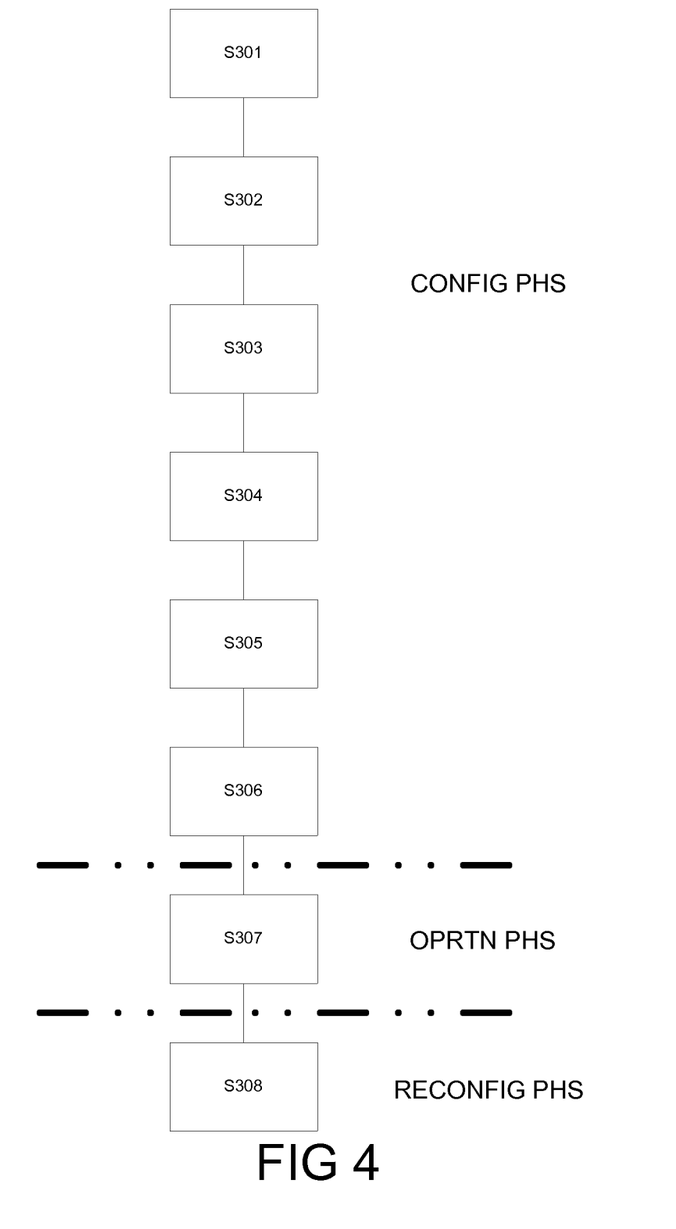
FIG. 4 is a flowchart representing a method for operating a communication device in accordance with an embodiment of the invention.

In accordance with this example, the process starts on step S301 when the communication devices 102a-j are powered on or attached on their respective lamps 101a-j. By default, the communication devices 102a-j may directly enter into the commissioning phase which is a configuration phase (CONFIG PHS).

At step S302, each communication device transmits a commissioning request to the network controller, after establishing a communication link 104 over the first physical interface or telecommunication mode (e.g. GPRS). This commissioning request may be performed by executing a mutual authentication handshake by means of the corresponding security protocol (e.g., DTLS or HIP or IPSec or another standard/proprietary one). This includes the exchange of respective identifiers. If the authentication handshake is successful, then the network controller has verified the communication device and the communication device has verified the network controller.

Then, if this step S302 is successful, the communication devices 102a-j can transfer their respective locations obtained from the GPS module 203 as well as other information. In a variant of this example, the communication device obtains details regarding its location based on GPRS (or UMTS or LTE) trilateration (for example based on base stations triangulation), as an alternative or a refinement of the GPS data. For example, this other information may include first telecommunication link quality, neighbours identities or count. Information about the neighbouring communication devices may be obtained by using the second telecommunication mode for example.

Based on the above information, the network controller obtains a map of the communication devices with the corresponding location (basically, the network controller may have a map of devices distributed in a city and compare it to the map of communication devices obtained). Then, at step S303 the network controller prepares the design of the networks for the operation phase, which is based on the second telecommunication mode. In an example, IP protocols and 802.15.4 are used and thus the network may become a set of 6LoWPAN networks. Therefore, the network controller can decide how to allocate the communication devices to different 6LoWPAN networks. This decision can be based on scalability or performance reasons, etc based on the location of the devices, topology, or buildings between nodes. For example, on FIG. 1, there are 3 6LoWPAN subnetworks 100a, 100g and 100j represented.

At step S304, the network controller may decide which role profiles will be allocated to which communication devices 102a-j, and then transmits the allocated roles to each communication device by means of the first telecommunication mode at step S305. For example, as shown on FIG. 1, it can be decided that the communication devices 102a, 102g and 102j will act as border routers for the respective subnetworks 100a, 100g and 100j. The other devices 102b-f and 102h-i will be end devices. It is to be noted that only two profiles are listed for the sake of clarity of this example. However, more role profiles may be needed depending on the complexity of the network, or its topology.

As seen above, the network controller at Step S305 pushes role profiles, for example including the 802.15.4/6LoWPAN configuration parameters for the CTC15.4 devices over the first communication interface (GPRS). For example, each CTC15.4 device receives a message over GPRS from City-Touch with configuration parameters for its 802.15.4 interface.

At step S306, which typically ends the commissioning phase, upon reception of the configuration parameters, the communication devices configure their role profiles for the second communication interface (or second telecommunication mode), e.g., IEEE802.15.4.

If the communication device has to act as an end-device, then it takes configuration parameters to act as an end-device communicating towards a border router. The configuration parameters can include a network key for the 6LoWPAN network, an IP address for the 6LoWPAN network, or the IP address of the border router. In this case, the first telecommunication mode is thus switched off or deactivated.

If the device has to act as a border router, then it becomes a border router. The configuration parameters can include a network key for the 6LoWPAN network or the list of devices in the network. In this case, the first telecommunication mode is maintained active for the operation as a router.

In a specific embodiment, the above configuration is a temporary configuration that the network controllers uses to analyse the performance of the subnetworks and to analyse whether a better allocation of nodes to subnetworks might lead to a better performance, e.g., if it is possible to reach all nodes, depending on the communication latency, or the hop count. If the network controller finds out that the initial (temporary) configuration is not optimal, then the network controller can push other networking parameters for the second telecommunication interface.

Once the configuration is done, the devices are thus ready to enter the operation phase and those devices that are to switch off the first telecommunication interface will switch it off. Note that in some circumstances it can be useful to keep the first telecommunication interface active, but use the second one only for the communication. For example, the deactivation of the first telecommunication mode may consist in preventing transmission of data while keeping the reception of data by this telecommunication mode active.

In this example, with the starting of the operation phase with Step S307, the communication devices 102a, 102g, and 102j will be in charge of connecting the communication devices of their respective subnetworks 100a, 100g and 100j to the network controller 105.

Depending on their roles, each of the communication devices having for example a router profile may continue to use the first telecommunication mode to communicate with the network controller 105 (communication devices 102a, 102g and 102j). All the devices 102a-j may also start (or resume if used in the commissioning phase for example to obtain information about neighbouring communication devices) using to use the second telecommunication mode, for example the IEEE802.15.4 interface as configured by the network controller, to communicate between the communication devices within the subnetworks 100a, 100g and 100j. In this case, at step S307, the end devices 102b-f and 102h-i have deactivated their first telecommunication module. These communication devices will only be able to talk to the network controller 105 by means of the second telecommunication mode (e.g. IEEE802.15.4/6LoWPAN) over their respective routers 102a, 102g or 102j.

It is to be noted that and the devices may switch off their transceiver for the first telecommunication mode as appropriate as soon as they have received their respective configuration data at the end of step S306, since this ends the commissioning phase. In a variant, the communication devices are awaiting a specific signal indicative of the starting the operation phase (OPRTN PHS) at step S307 to deactivate their first telecommunication modules simultaneously. This solution might seem more complex and more expensive, since it requires two different telecommunication modules in each communication device. But the fact is that it is simpler because the commissioning process is automatic over the first telecommunication link—later steps are done from the backend and cheaper. The analysis shows that this solution offers the best average cost per device and commissioning when compared with previous network types.

The table below a potential communication stack of the above proposed examples.

|  | COAP |  |
|---|---|---|
|  | DTLS |  |
|  | UDP |  |
|  | HIP |  |
|  | 6LoWPAN |  |
|  | IPv6 |  |
| GPRS |  | IEEE802.15.4 |

This stack is IP-based and uses the CoAP protocol for the management of the devices. CoAP is a restful protocol ("kind of" lightweight version of HTTP). The stacks rely on IPv6 for the network connectivity that is transported on top of GPRS and IEEE802.15.4. For the case, of IEEE802.15.4, IPv6 is adapted by 6LoWPAN to compress headers, etc. Furthermore, DTLS, a security protocol whose usage is required to secure CoAP, may be provided. It is also possible to have HIP, a security protocol that offers a stable identifier to upper layers so that if even the IP address changes due to any reasons (roaming, NAT if IPv4 is used), the security connection remains stable. The security handshake by means of HIP is also more efficient. Both features lead to a lower overhead when compared with a solution based on DTLS only.

As represented at step S308, the network may be reconfigured (RECONFIG PHS), for example, once the operation of the network has been tested. The network controller can perform one or the other of the following in variants of the above described embodiments.

If the performance of the network is not good, then a new configuration can be pushed towards the communication devices through the second telecommunication mode. It may also be sent by the first telecommunication link of each individual communication device after transmission, through the second telecommunication mode, of a specific activation command of the first telecommunication mode. With such a new configuration, a communication device can change again its role (become end device or border router). Also it can happen that the performance is very good and then the subnetworks can be extended or the number of routers may be lowered without affecting the network robustness. For example, the network controller may have decided to have a number of small sub networks but since the performance is better than expected, then the subnetworks become larger and the number of border routers can be reduced.

In a variant of the above embodiments, the operation tests are carried out before the first telecommunication mode is deactivated in the nodes. Thus, if everything is ok, then the network controller may send a "First telecommunication mode (e.g. GPRS) Deactivation Command" to the communication devices acting as end-devices only at this stage. This command deactivates the GPRS link of those devices. The reason for doing this is to reduce the operational costs after the automatic commissioning over the GPRS link.

It can also happen that a device whose first telecommunication link was deactivated needs to be activated again. In this case, the network controller management system might also send an activation command to the device over the second telecommunication mode.

This invention is not only applicable to Lighting networks but could also apply for any types of networks, like home automation networks, smart meter networks, sensor networks . . . .

Although in the examples the network is a wireless network and the communication devices are wireless devices, it is to be noted that the invention applies for wired networks. In particular, it is possible that the second telecommunication mode is wired. For example, it could be a communication through powerline, or Ethernet (which could be used for powering the communication devices).

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations of the components of the network system according to various embodiments can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method for operating a communication device comprising a transceiver configured to communicate in a communication network, the method comprising:
    a configuration phase including the steps of:
    (a1) the communication device obtaining by means of a first telecommunication mode a selected role profile selected out of a set of role profiles, said selected role profile defining the role of the communication device in the communication network in an operation phase;
    (a2) configuring or updating the communication network, with a network controller, by means of the communication device using the first telecommunication mode, wherein said configuring or updating is based on a second telecommunication mode, and
    an operation phase including the steps of:
    (b1) the communication device disabling or maintaining its transceiver to communicate by means of the first telecommunication mode depending on the selected role profile, and disabling the transceiver to communicate with the first telecommunication mode if the selected profile is an end device profile;
    (b2) the communication device communicating in the communication network using said second telecommunication mode.

2. The method of claim 1, wherein step (b1) further comprises maintaining the transceiver to communicate with the first telecommunication mode if the selected profile is a router profile, and wherein step (b2) further comprises the communication device communicating in the communication network using the first telecommunication mode.

3. The method of claim 2, wherein at step (b2) the first telecommunication mode is used to communicate between the communication device and the network controller, and the second telecommunication mode is used to communicate between the communication device and further communication devices of the communication network.

4. The method of claim 1, wherein step (a1) comprises the communication device determining a set of parameter values, and transmitting the set of parameter values to the network controller for selection of the selected role profile of the communication device.

5. The method of claim 4, wherein the set of parameters includes at least one of the following: identifier, neighboring communication devices identifiers, geolocation details, link quality of the first telecommunication mode, link quality of the second telecommunication mode.

6. The method of claim 1, wherein the configuration phase is triggered for a commissioning phase during which the communication network is configured or for an update phase during which at least the wireless node is reconfigured.

7. The method of claim 6, wherein the update phase is triggered if the communication network performance is below a first threshold or is above a second threshold.

8. The method of claim 1, wherein the first telecommunication mode is of longer range than the second telecommunication mode.

9. The method of claim 1, wherein the first telecommunication mode is one of the following communication technologies: GPRS, UMTS, CDMA2000, LTE.

10. The method of claim 1, wherein the second telecommunication mode is based on IEEE 802.15.4, or on communication through powerline.

11. The method of claim 1, wherein the communication network is a lighting network.

12. A communication device comprising:
    a transceiver configured to communicate in a communication network, the transceiver configured to, in a configuration phase, obtain by means of a first telecommunication mode a selected role profile selected out of a set of role profiles, and, in an operation phase, communicate in the communication network using a second telecommunication mode,
    the communication device further comprising a processor configured to, in an operation phase, behave in accordance with said selected role profile in the communication network, and, in the operation phase, disable or maintain the transceiver to communicate by means of the first telecommunication mode depending on the selected role profile, wherein said communication device is configured to disable said transceiver to communicate with said first telecommunication mode if said selected profile is an end device profile,
    wherein said communication device is configured to configure or update said communication network during said configuration phase, with a network controller, by means of said first telecommunication mode based on said second telecommunication mode.

13. The luminaire comprising a communication device according to claim 12, wherein the luminaire operation is controlled by commands received by the communication device.

14. A communication network, comprising at least one communication device of claim 12.

* * * * *